Sept. 30, 1947.     R. G. CLAPP ET AL     2,428,202
DIRECT-CURRENT MOTOR SUPPLY CIRCUIT
Filed Nov. 2, 1943
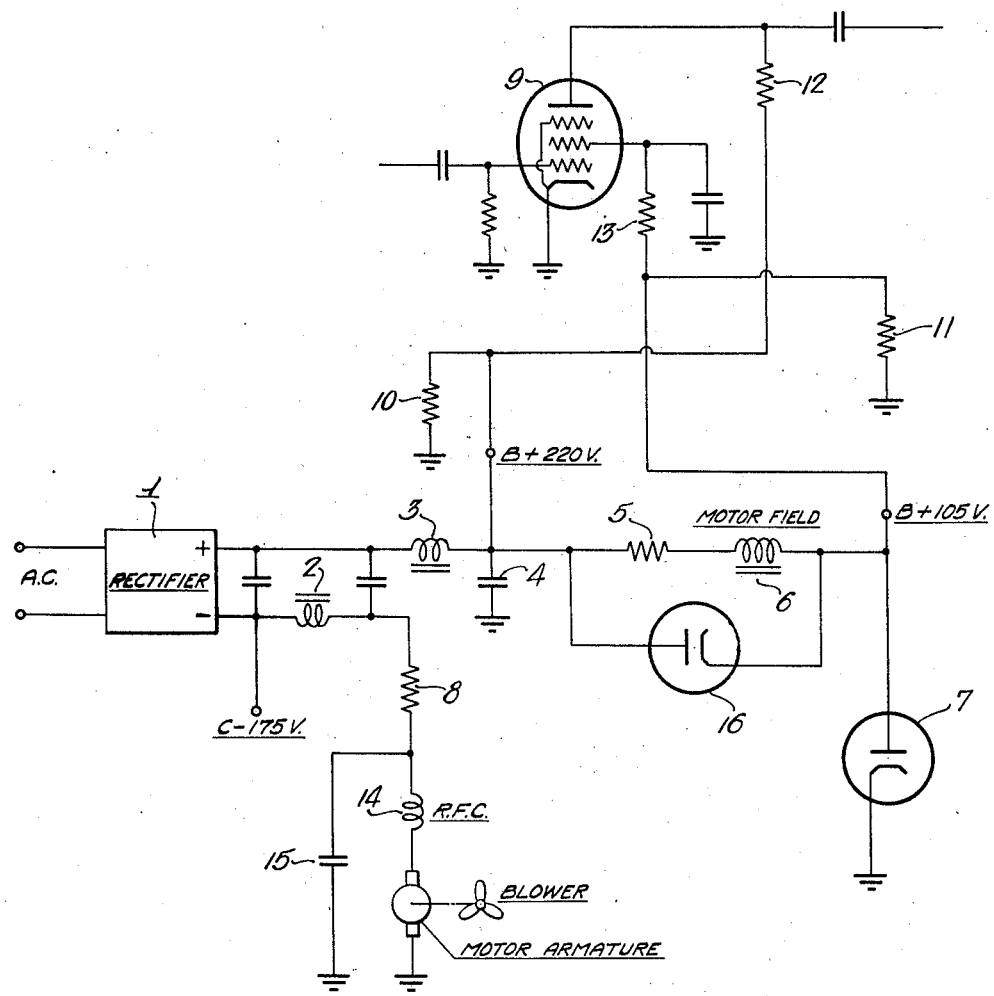
Inventors:
Richard G. Clapp
Charles E. Dolberg
by their Attorneys
Howson & Howson Patented Sept. 30, 1947

2,428,202

UNITED STATES PATENT OFFICE 2,428,202

DIRECT-CURRENT MOTOR SUPPLY CIRCUITS

Richard G. Clapp, Haverford, and Charles E. Dolberg, Philadelphia, Pa., assignors, by mesne assignments, to Philco Corporation, Philadelphia, Pa., a corporation of Pennsylvania Application November 2, 1943, Serial No. 508,730

2 Claims. (Cl. 250—27)

1

This invention relates to supply circuits for direct-current motors, and more particularly to improved circuit arrangements to make possible the satisfactory operation of small conventional direct-current motors from the high voltage direct-current supply sources commonly employed in radio communication apparatus and the like.

It has long been customary, in certain types of communication apparatus, to effect air cooling of the parts by placing the said parts in the path of an air blast produced by fans or blowers. More recently such fans or blowers have been extensively used to air-cool communication apparatus housed in sealed, or pressurized, containers wherein such containers are necessary to enable the said apparatus to be used over a great range of altitudes and barometric pressures, as for example in aircraft or balloons.

In the past it has been customary to operate such fans or blowers from small electric motors powered from an external voltage source, e. g., from one of the aircraft's generators. While this is sometimes a practical solution, it has the marked disadvantage that it introduces an additional source of heat which would not otherwise be present. By the present invention, however, circuit means and connections are provided whereby a small direct-current motor may be satisfactorily energized from the high voltage supply source of the equipment, the said motor utilizing energy which, at least to a considerable extent, would normally be dissipated within the apparatus whether usefully or not.

Accordingly it is a principal object of the present invention to provide a motor supply circuit, adapted for use in pressurized communication-apparatus containers, which will operate a motor in a satisfactory manner without substantially increasing the heat generated within the container and which must be disposed of to insure satisfactory operation of the communication apparatus.

It is a further object of the invention to provide a supply circuit for a direct current motor in which approximately rated current is supplied to the armature thereof, and in which the field winding is supplied with a substantially fixed predetermined voltage.

It is another object of the invention to provide a motor supply circuit which will provide satisfactory motor operation even in the face of substantial fluctuations in the supply source voltage.

Other objects and features of the invention, as well as the invention itself, will best be understood by reference to the accompanying drawing,

2 in which the single figure is a schematic diagram of one embodiment of the invention.

In the drawing there is represented, schematically, those portions of a radio receiver and power supply circuit to which the present invention relates. The high voltage source may comprise, for example, a conventional rectifier device 1 connected to the designated terminals of an alternating current source. The output current of the rectifier may be filtered by means of a conventional filter system 2 comprising series inductance and shunt capacitance. If desired an additional series inductance 3 and shunt capacitor 4 may be provided in the positive side of the high voltage circuit. The high voltage output of the rectifier may be derived from the terminal designated B+220 v. Where filtered current at a somewhat lower voltage is desired a voltage dropping resistor 5 and an additional filter choke 6 (to be referred to in detail hereinafter) may be connected between the choke 3 and the terminal designated B+105 v. The voltage from the last-named terminal may be regulated, i. e., caused to remain substantially fixed in spite of line voltage or load current variations, by connecting a suitable voltage regulating tube 7 between the terminal B+105 v. and ground.

The negative side of the rectifier 1 may be connected to ground through a voltage dropping resistor 8 and a motor armature to be described in detail hereinafter. The bias voltage provided at the terminal designated C—175 v. may be utilized wherever a bias voltage or voltages may be necessary.

Since the invention does not relate to the specific receiver circuit employed, only a portion of the receiver has been shown, the vacuum tube 9 representing, for example, one of the intermediate frequency amplifier stages of the said receiver. Other of the receiver circuits are represented schematically by the generalized impedance elements 10 and 11. Various of the receiver circuits, such as the circuit comprising the impedance 10, and the circuit comprising the load resistor 12 and plate circuit of the amplifier 9, may be supplied with current from the terminal designated B+220 v. Similarly other of the receiver circuits, such as the circuit comprising the impedance 11, and the circuit comprising the resistor 13 and screen circuit of the amplifier 9, may be supplied with current from the terminal designated B+105 v.

As indicated above it is customary, where it is desired to provide a source of voltage substantially lower than that supplied by the rectifier, to provide voltage dropping means which may comprise, for example, a series resistor 5 and, if desired, additional filtering in the form of an added choke coil 6, the resistance of which may also be substantial. According to the present invention, instead of dissipating power unnecessarily in voltage dropping elements of this character, the field coil of the blower motor is substituted for the choke coil normally employed, the additional series resistor 5 being decreased in magnitude, if necessary, to compensate for a possible increase in the resistance of the field winding as compared to the resistance of the choke coil. A field coil should be chosen of course which will provide the proper magnetic field at the current level existing in the circuit in which it is placed.

The armature of the blower motor, on the other hand, may be placed in the negative side of the rectifier's output circuit as illustrated. A radio frequency choke coil 14 may be connected in series with the armature, and a radio frequency by-pass condenser 15 connected in shunt with the armature and choke coil to prevent interference in the equipment due to sparking.

In the circuit hereinbefore described the armature of the motor is supplied with the entire output current of the rectifier, while the motor's field coil 6 is supplied with only a desired fraction of the output current of the rectifier, since a portion of the output current of the rectifier is diverted through the plate circuit of the tube 9 and various other circuits comprising the impedance 10.

In accordance with another aspect of the invention a voltage regulator tube 16 is connected in shunt with the motor field winding 6, the function of this regulator tube being to maintain a constant voltage across the said field winding. Since such regulator tubes are well known in the art, it is deemed unnecessary to describe their operation, and the means by which they tend to maintain a constant voltage across their terminals.

Prior to the present invention, both shunt and series motors were connected in the circuit of the diagram at the point which now includes the armature only.

It was found, however, that, where direct current motors depend for their operation upon sources of alternating current which fluctuate in voltage over a considerable range, neither series nor shunt motor connections are satisfactory, for the reason that the speed of the motor varies over undesirably wide limits. However, by utilizing the circuit arrangement illustrated in the drawing, i. e., by separating the two portions of the motor, and by connecting the armature in the negative lead of the rectifier to receive the total current thereof, by connecting the field winding in the positive lead of the rectifier to receive a predetermined portion only of the rectifier output, and, in addition, by regulating the voltage applied to the field winding, it has been found that a highly superior motor operation results, the operation of the said motor remaining satisfactory even in the presence of considerable voltage fluctuation at the rectifier input terminals.

In one embodiment of the invention the resistor 8 had a value of 850 ohms, and the resistor 5 had a value of 1500 ohms. The voltage regulator tubes were of a type designated VR–105.

While the preferred embodiment has been illustrated and described, it will be understood, of course, that the invention is susceptible of various modifications, and that the invention contemplates such changes as may fall within the scope of the appended claims.

We claim:

1. A power supply system for radio apparatus, comprising connections for supplying alternating current to said power supply system; and a sealed housing containing: a rectifier, a plurality of impedances providing a filter, radio apparatus including a vacuum tube having a cathode, grid and anode, a series motor connected across the output of said filter, the field of said motor being connected between said anode and said cathode, the armature of said motor being connected between said cathode and the negative terminal of said filter, and a voltage regulator connected across said field; whereby a substantial portion of the energy required to provide potential division for the radio apparatus is utilized by the motor, and the energy distribution between the armature and the voltage-regulated field of said motor provides potential division for the radio apparatus.

2. A power supply system for radio apparatus, comprising connections for supplying alternating current to said power supply system; and a sealed housing containing: a rectifier, a plurality of impedances providing a filter, radio apparatus including a vacuum tube having a cathode, grid, screen and anode, a series motor connected across the output of said filter, the field of said motor being connected between said anode and said screen, the armature of said motor being connected between said cathode and the negative terminal of said filter, a voltage regulator connected across said field and a voltage regulator connected between said screen and said cathode, whereby a substantial portion of the energy required to provide potential division for the radio apparatus is utilized by the motor, and the energy distribution between the armature and the voltage-regulated field of said motor provides potential division for the radio apparatus.

RICHARD G. CLAPP.
CHARLES E. DOLBERG.

REFERENCES CITED

The following references are of record in the file of this patent:

UNITED STATES PATENTS

| Number | Name | Date |
|---|---|---|
| 1,459,428 | Wold | June 19, 1923 |
| 1,091,256 | Thomas | Mar. 24, 1914 |
| 2,064,388 | Smellie | Dec. 15, 1936 |
| 2,046,675 | Daiger | July 7, 1936 |
| 1,966,077 | Nyman | July 10, 1934 |

FOREIGN PATENTS

| Number | Country | Date |
|---|---|---|
| 566,811 | France | Nov. 27, 1923 |